United States Patent [19]

Schenk et al.

[11] 4,009,053
[45] Feb. 22, 1977

[54] WRAPPED-ELECTRODE BATTERY

[75] Inventors: Gerd Schenk, Iserlohn; Heinz Haake, Rummenohl, both of Germany

[73] Assignee: Varta Batterie Aktiengesellschaft, Hannover, Germany

[22] Filed: June 16, 1975

[21] Appl. No.: 587,165

[30] Foreign Application Priority Data

Aug. 9, 1974  Germany ............... 2438296

[52] U.S. Cl. .................... 429/94; 429/163
[51] Int. Cl.² ........................ H01M 2/30
[58] Field of Search ........... 136/13, 134 P, 135 R, 136/133

[56] References Cited

UNITED STATES PATENTS

| | | | |
|---|---|---|---|
| 3,484,301 | 12/1967 | Gray | 136/133 |
| 3,503,806 | 3/1970 | Sugalski | 136/13 |
| 3,732,124 | 5/1974 | Cailley | 136/13 |
| 3,790,408 | 2/1974 | Cromer | 136/13 |
| 3,836,400 | 9/1974 | Strauss | 136/133 |
| 3,837,925 | 9/1974 | Cailley et al. | 136/134 P |

Primary Examiner—Donald L. Walton
Attorney, Agent, or Firm—Weiser, Stapler & Spivak

[57] ABSTRACT

A wrapped battery electrode is connected to the current take-off conductor by projections from radial slots in the conductor which engage the rim of the electrode.

The projections are formed in the course of the punching operation which forms the slots.

3 Claims, 3 Drawing Figures

WRAPPED-ELECTRODE BATTERY

The invention relates to a storage battery with wrapped electrodes, also known as "spirally wound" electrodes, provided with a current take-off at their rim.

Wrapped electrodes are especially suitable for hermetic alkaline storage batteries because their large surface area is suitable for high current loads. The intensity of the discharge current depends strongly on the electrical resistance of the take-off connectors which, in turn, is determined by their length and cross section.

German patents Nos. 1,233,040 and 1,248,770 disclose alkaline storage batteries in which protruding, mass-free rims of the electrodes have adjacent turns welded together at several points along their spiral lengths, and in which these rims are permanently attached to current take-off conductors.

This type of current take-off has problems in its construction and in its method of production. In particular, the welding together of mass-free rims of adjacent electrode turns at several points in their spiral path requires a considerable effort which increases the costs of the production.

Accordingly, it is an object to provide a current take-off which is capable of supporting high current loads, which is simple to produce and which requires no additional structural elements.

This and other objects which will appear are achieved in accordance with the invention by providing the current take-off conductor with a plurality of radially extending slots having projecting edges which engage the rim of the electrode.

Figure 1:
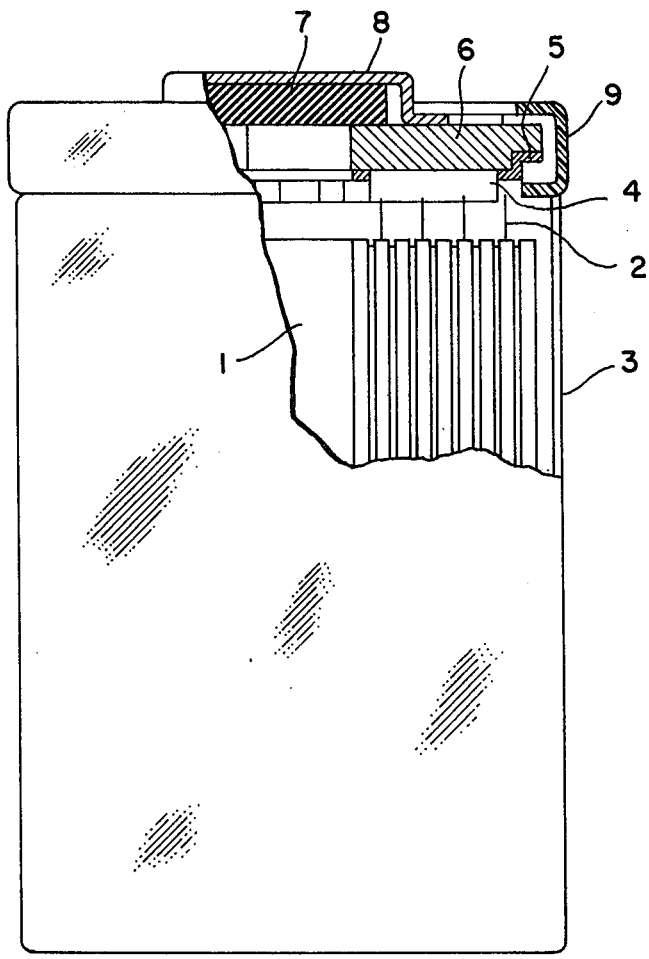
Figure 2:
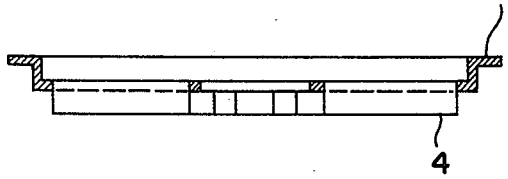
Figure 3:
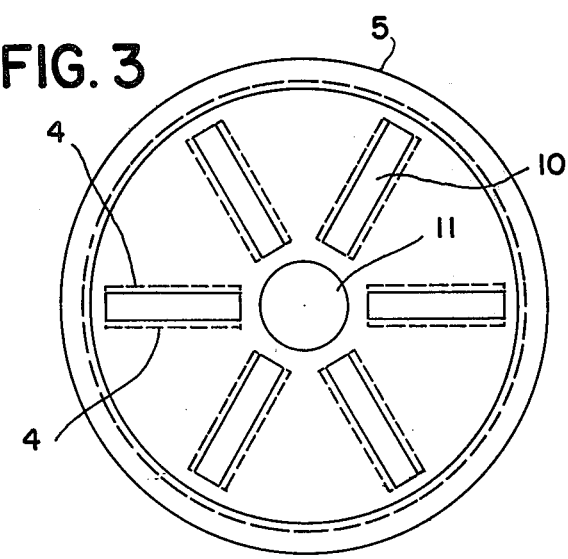

For further details, reference is made to the discussion which follows in the light of the accompanying drawings, wherein FIG. 1 shows an elevation, partly in section, of a battery embodying the invention;

FIG. 2 shows a cross-sectional elevation of the current take-off conductor of the battery of FIG. 1; and FIG. 3 shows a top view of that conductor.

Referring particularly to FIG. 1, this shows a cell casing 3 in which the wrapped electrode 1 is positioned. The opposite poled electrodes of wrap 1 are axially displaced with respect to each other, in such a manner that the mass-free rims of the wrapped coils protrude in both directions from the wrap.

The upper mass-free rim 2 is attached at several points in its spiral path to the projecting edges 4 of slots 10 of current take-off conductor 5. The attachment preferably takes place through electrical welding, using a spot welding technique.

Lid 6 and cell casing 3, which are at different potentials, are insulated from each other by gasket 9. Lid 6 rests on current take-off conductor 5. The conductive connection between these elements is provided by the closing pressure which is created when the cell is sealed. If desired, lid 6 and current take-off conductor 5 may be electrically welded together to further reduce the junction resistance.

Cover 6 has an opening equipped, in customary manner, with an elastic seal 7 retained by cell connector 8.

FIGS. 2 and 3 show the current take-off conductor 5, which is seen to have the form of a dish with an offset rim forming a seat for lid 6. The underside of current take-off conductor 5 is provided with several radially extending slots 10, each of which has two projecting edges 4. These edges 4 are preferably produced by means of a punching tool which is narrower than the slot in the female die by about twice the thickness of the material of which conductor 5 is formed. This punch cuts the metal and turns up the edges of the cut so that they project as shown. In its center, the current take-off conductor has an opening 11 which, together with slots 10, permits electrolyte exchange.

The large number of slots and projecting edges makes possible many electrical contacts to the rim of the spiral electrodes. Moreover, the current take-off conductor can be connected to the electrodes principally by pressure, which considerably simplifies the assembly of such a cell. Preferably, however, the projecting edges are connected to the electrode rim which they engage through spot welds.

Cells embodying the invention have considerably better properties under high current loads than comparable cells with wrapped electrodes. This manifests itself as a 5–10% higher terminal voltage for equal discharge currents.

We claim:

1. In a storage battery having a wrapped electrode, a current take-off conductor contacting the rim of the eletrode, and a conductive lid contacting the conductor, the improvement wherein the current take-off conductor is a generally circular plate having a plurality of radial slots extending between a solid inner annular portion and a solid outer annular portion, the slots having confronting radial edges turned out of the plane of the plate and extending across consecutive turns of the wrapped electrode and engaging the adjacent rim of the electrode, the conductive lid being of annular shape and resting directly on the take-off conductor plate and extending radially from the inner to the outer solid portion of the plate, and means are provided for pressing the lid against the conductor plate through closure of the battery, whereby conductive connection is established between the plate and the lid.

2. The battery of claim 1 having a cell connector, and an elastic seal between the cell connector and the inner edge of the annular lid.

3. The battery of claim 1 wherein the take-off conductor plate has an offset outer rim forming a seat for the lid plate.

* * * * *